United States Patent
Cummings et al.

(10) Patent No.: US 9,317,258 B2
(45) Date of Patent: Apr. 19, 2016

(54) DYNAMIC VALIDATION OF MODELS USING CONSTRAINT TARGETS

(75) Inventors: David A. Cummings, Stittsville (CA); Maneesh Goyal, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1461 days.

(21) Appl. No.: 11/953,663

(22) Filed: Dec. 10, 2007

(65) Prior Publication Data

US 2009/0150859 A1    Jun. 11, 2009

(51) Int. Cl.
*G06F 9/44*    (2006.01)

(52) U.S. Cl.
CPC .. *G06F 8/35* (2013.01); *G06F 8/00* (2013.01); *G06F 8/10* (2013.01); *G06F 8/33* (2013.01); *G06F 8/34* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 6,618,851 B1 * | 9/2003 | Zundel et al. | 717/103 |
| 6,915,454 B1 * | 7/2005 | Moore | G06F 11/0709 714/38.14 |
| 7,437,707 B2 * | 10/2008 | Huerta et al. | 717/104 |
| 7,542,985 B1 * | 6/2009 | Compton | G06F 11/0709 |
| 7,818,730 B1 * | 10/2010 | Ryan | G06F 8/34 717/140 |
| 7,870,540 B2 * | 1/2011 | Zare | G06F 11/3604 717/109 |
| 7,904,809 B2 * | 3/2011 | Corning | G06F 17/2247 715/255 |
| 2005/0125438 A1 * | 6/2005 | Krishnaswamy et al. | 707/102 |
| 2006/0101445 A1 * | 5/2006 | Carbajales et al. | 717/165 |
| 2006/0229888 A1 * | 10/2006 | Colle | G06Q 10/00 717/108 |
| 2007/0101322 A1 * | 5/2007 | Muschett et al. | 717/168 |
| 2008/0127041 A1 * | 5/2008 | Gura | 717/101 |

* cited by examiner

*Primary Examiner* — Charles Swift
(74) *Attorney, Agent, or Firm* — Steven M. Greenberg, Esq.; CRGO Law

(57) ABSTRACT

Embodiments of the present invention address deficiencies of the art in respect to model validation for modeling tools and provide a novel and non-obvious method, system and computer program product for dynamic validation of models using constraint targets. In an embodiment of the invention, a method for dynamic validation of models using constraint targets can be provided. The method can include defining constraint targets on object validation in a model within a MDD tool to object instances affected by a change in another object in the model, detecting a change in an object instance in the model in the MDD tool, and validating only other object instances in the model that are affected by the detected change.

12 Claims, 1 Drawing Sheet

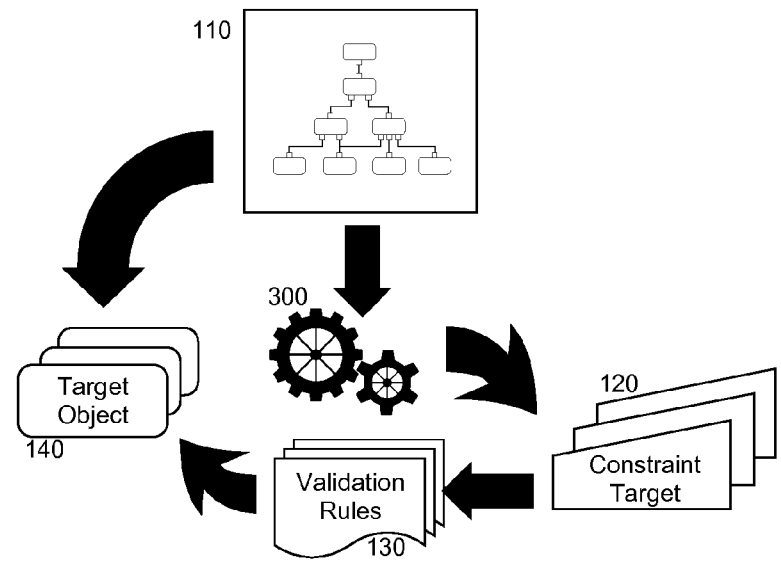
FIG. 1
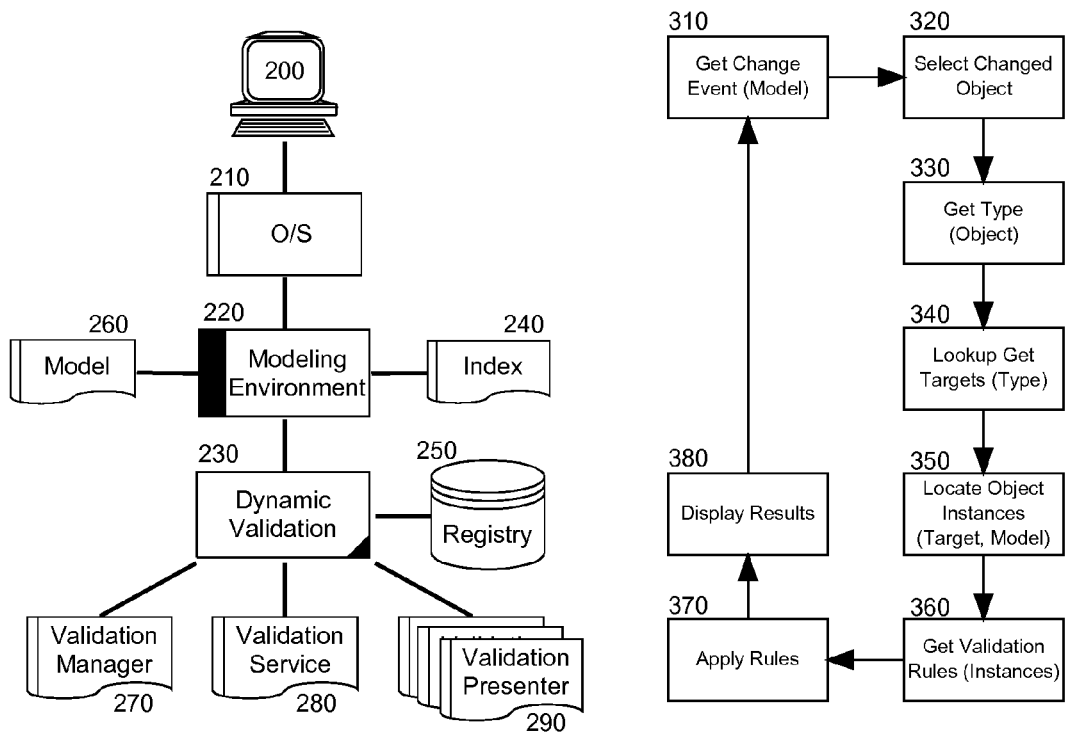
FIG. 2
FIG. 3

DYNAMIC VALIDATION OF MODELS USING CONSTRAINT TARGETS

BACKGROUND OF THE INVENTION

1. Field of the Invention

The present invention relates to the field of model driving development and more particularly to model validation in a model driven development environment.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development.

Modeling complex applications has several general benefits which can include a better understanding of the business or engineering situation at hand, the construction and design of application architectures, and the creation of visualizations of code and other forms of implementation. In this regard, the essence of modeling is abstraction and any visualization of code is indeed an abstraction in that application information can be selectively exposed while details deemed unnecessary or unwanted can be suppressed. Nevertheless, the terms "code model", "implementation model" or "platform-specific model" (PSM) are often used to qualify such abstractions from a higher-level, platform independent model (PIM) that does not have such direct relationships to program code.

In conventional MDD, visual models can be created utilizing model constructs or model types. The visual models can be created from a methodological process that often begins with application requirements and culminates with a high-level architectural design model. Developers can create a detailed design model from which skeletal code can be generated to an integrated development environment. The integrated development environment, in turn, can be used to complete the detailed coding. Any changes to the code that affect the design model can be synchronized back into the model. Likewise, any model changes can be synchronized into the existing code.

As with all software development techniques, in MDD user-introduced mistakes arise during code development. Typical modeling tools allow a model under development to be validated against mistakes through user initiated automated validation. Yet, with the advent of the intelligent integrated development environment (IDE), end users have come to expect instant feedback as they develop code. Current IDE for generalized code development (and not MDD) offer code highlighting, where the user's source code is highlighted when they have made mistakes. Often a list of recognized problems can be presented somewhere in the IDE and can be updated as the user develops code.

To that end, the conventional IDE can provide suggested ways for the mistake to be resolved. This instant feedback ought to be extended to users engaging in MDD. Yet, presenting a dynamic view of modeling validation problems to the user is not as simple as providing feedback regarding a source file. Rather, models can be very large and running validation on the entire model each time the user makes a change could consume minutes, making the tool unusable.

Current model validation infrastructures (such as EMFT validation) do provide a mechanism for dynamic validation for MDD, often referred to as live validation. Still, writing validation rules to leverage these types of infrastructures can be very difficult as these infrastructures require the rule developer to thoroughly inspect all model changes including those do not apply to the target of the validation rule itself. Notably, a complex validation rule could involve writing a thousand lines of code. Thus, although possible, these validation infrastructures make adding dynamic validation to a modeling tool difficult and time consuming.

BRIEF SUMMARY OF THE INVENTION

Embodiments of the present invention address deficiencies of the art in respect to model validation for modeling tools and provide a novel and non-obvious method, system and computer program product for dynamic validation of models using constraint targets. In an embodiment of the invention, a method for dynamic validation of models using constraint targets can be provided. The method can include defining constraint targets on object validation in a model within a MDD tool to object instances affected by a change in another object in the model, detecting a change in an object instance in the model in the MDD tool, and validating only other object instances in the model that are affected by the detected change.

In one aspect of the embodiment, defining constraint targets on object validation in a model within a MDD tool to object instances affected by a change in another object in the model, can include specifying an object type for an object in the model where changes to an object instance of the object type result in application of a validation rule to a target object instance. In another aspect of the embodiment, the method further can include expressing the defined constraint target as an extension point. In yet a further aspect of the embodiment, validating only other object instances in the model that are affected by the detected change can include matching a target object instance to an object type for an object in which the change as been detected, loading a validation rule for the target object instance, and applying the validation rule to the target object instance. Finally, in even yet a further aspect of the embodiment, the method also can include passing results from having applied the validation rule to the target object instance to a registered presenter of results.

In another embodiment of the invention, an MDD tool data processing system can be provided. The system can include a validation service coupled to an MDD tool. The validation service can include program code enabled to apply a validation rule to a target object instance in model in the MDD tool. The system also can include a validation manager coupled to the validation service. The validation manager can include program code enabled to detecting a change in an object instance in the model in the MDD tool, and to request validation from the validation service only for other object instances in the model that are affected by the detected change. Finally, in an aspect of the embodiment, a constraint target registry can be rendered accessible by the validation manager. The registry can store a list of constraint targets on object validation in the model to object instances affected by a change in another object in the model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for dynamic validation of models using constraint targets;

FIG. 2 is a schematic illustration of a MDD data processing system configured for dynamic validation of models using constraint targets; and, FIG. 3 is a flow chart illustrating a process for dynamic validation of models using constraint targets.

DETAILED DESCRIPTION OF THE INVENTION

Embodiments of the present invention provide a method, system and computer program product for dynamic validation of models using constraint targets. In accordance with an embodiment of the present invention, validation rules can be established for respectively different instances of target objects in a model within a MDD tool. One or more constraint targets further can be defined for each of the different instances specifying when changes to other types of object instances in the model require validation of an associated one of the instances. Thereafter, as a change is detected in an instance of an object in the model of a particular type, those instances of target objects associated with the particular type can be validated with corresponding validation rules. In this way, the process of validating instances of target objects dynamically in the model can be optimized for only those instances of target objects affected by a change in another object instance in the model.

In further illustration, FIG. 1 is a pictorial illustration of a process for dynamic validation of models using constraint targets. As shown in FIG. 1, validation rules 130 for different target object instances 140 in a model 110 in a MDD environment can be established. Separately, constraint targets 120 can be defined associating object types with the different target object instances 140. In this regard, each of the constraint targets 120 can map an object type with a corresponding one of the target object instances 140. Thereafter, a dynamic validation process 300 can detect changes in the model 110 and can apply selected ones of the validation rules 130 to those of the target object instance 140 affected by the change according to the constraint targets 120. In this way, validation need not be performed on the entirety of the model 110, but only on those of the target object instances 140 affected by the change.

In further illustration, FIG. 2 is a schematic illustration of a MDD data processing system configured for dynamic validation of models using constraint targets. The system can include a host computing platform 200 supporting the operation of an operating system 210. The operating system 210 in turn can host the execution of a modeling environment 220 such as an MDD environment. The modeling environment 220 can be configured to define and produce program code consistent with a model 260 including different instances of objects in the model as cataloged in an index 240 for the model 260.

Dynamic validation logic 230 can be coupled to the modeling environment 220. The dynamic validation logic 230 can manage the execution of three separate logical components: a validation manger 270, a validation service 280 and one or more validation presenters 290. The validation manager 270 can coordinate the actions of the validation service 280. The validation service 280 in turn can execute validation rule algorithms for a given request and can provide a list of validation statuses in terms of successes or failures and can indicate the outcome of a validation request. Finally, the validation presenters 290 each can present validation results to the user using a respective user interface. Each of the validation presenters 290 can registers with the validation manager 270 which in turn provides the registering validation presenters with validation results.

The validation service 280 can be coupled to a constraint target registry 250. The constraint target registry 250 can maintain a list of constraint targets by parsing the constraint targets defined in an extension point or programmatically through a corresponding API. In this regard, a constraint target can be defined as an extension point to a development framework such as the Eclipse Foundation Eclipse™ framework. An exemplary extension point can include

```
<extension point="constraintTargets">
    <constraintTargets>
        <namespace prefix="uml" uri="http://www.eclipse.org/UML">
        </namespace>
        <targets constraintId="my.constraint.id">
            <target eClassName="uml:Class">
                <trigger eClassName="uml:Interface"/>
                <trigger eClassName="uml:Association"/>
                <optimizer class="MyConstraintIdOptimizer"/>
            </target>
        </targets>
    </constraintTargets>
</extension>
```

The namespace portion of the constraint target in the exemplary extension point can define the meta-model involved in the constraint target. The meta-model in turn can define the types of objects that can be applied to a model. For example, the UML meta-model defines Class, Interface etc. Each target can be defined by its related constraintId (identifier of the validation rule) and the object type of the target for the rule. Further, each trigger can be defined by its object type. Optionally, clients can additionally define an optimizer alongside a defined constraint target. For example, the optimizer can be a Java class with a single method which accepts an instance of a target object and an instance of a trigger object. The method can return a boolean value indicating if the change in a trigger is in fact related to the target in question, and whether validation should be run on the target. The method as such can be used to optimize performance and reduce unnecessary validation.

In operation, the validation manager 270 can receive a model change event and can identify all of the types of objects that have changed in the model 260. For each type of object that has change and an active rule, the validation manager 270 can query the constraint target registry 250 for applicable target types. Subsequently, for each target type returned, the validation manager 270 can query the index 240 for actual instances of the target within the model 260. The validation manager 270 further can query the constraint target registry for an applicable constraint target optimizer (not shown). If an applicable constraint target optimizer can be located, the validation manager 270 can use the optimizer to determine if validation should be run on the target.

Thereafter, the validation manager 270 can request a validation execution on the given target for the applicable validation rule from the validation service 280. The validation service 280 can receive the request and can execute the rule's validation algorithm which generates a failure or success status, passing this status back to the validation manager 270. Finally, the validation manager 270 can propagate this validation result to any of the registered validation presenters 290 which in turn can present the results to the user.

In yet further illustration of the operation of the validation manager 270, FIG. 3 is a flow chart illustrating a process for dynamic validation of models using constraint targets. Beginning in block 310 a change event can be detected in a model in the MDD environment. In block 320 a changed object in the model can be selected and the type of the changed object can be determined in block 330. In block 340, associated targets can be identified in reference to the object type for the changed object and in block 350 instances of the associated targets in the model can be located. Thereafter, in block 360 the validation rules for the instances can be retrieved and in block 370 the retrieved rules can be applied to the located instances of the associated targets. Finally, in block 380 the results of the validation can be displayed and the process can return to block 310.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for dynamic validation of models using constraint targets, the method comprising:

defining constraint targets on object validation in a model within a model driven development (MDD) tool to object instances affected by a change in another object in the model within the MDD tool, the constraint targets associating different types of objects with corresponding different target object instances;

detecting a change in an object instance in the model in the MDD tool;

determining a type of the changed object instance;

identifying other object instances in the model within the MDD tool defined by the constraint targets to be associated with the determined type; and, validating only the other object instances in the model within the MDD tool that are affected by the detected change as specified by the defined constraint targets.

2. The method of claim 1, wherein defining constraint targets on object validation in a model within a MDD tool to object instances affected by a change in another object in the model, comprises specifying an object type for an object in the model where changes to an object instance of the object type result in application of a validation rule to a target object instance.

3. The method of claim 2, further comprising expressing the defined constraint target as an extension point.

4. The method of claim 1, wherein validating only other object instances in the model that are affected by the detected change, comprises:

matching a target object instance to an object type for an object in which the change as been detected;

loading a validation rule for the target object instance; and, applying the validation rule to the target object instance.

5. The method of claim 4, further comprising passing results from having applied the validation rule to the target object instance to a registered presenter of results.

6. A model driven development (MDD) tool data processing system comprising:

a computer system with at least one processor and memory;

a validation service coupled to an MDD tool executing in the memory of the computer system, the validation service comprising program code enabled to apply a validation rule to a target object instance in model in the MDD tool; and, a validation manager coupled to the validation service, the validation manager comprising program code enabled to define constraint targets within the MDD tool, the constraint targets associating different types of objects with corresponding different target object instances detecting a change in an object instance in the model in the MDD tool, determine a type of the changed object instance, identify other object instances in the model within the MDD tool defined by the constraint targets to be associated with the determined type, and to request validation from the validation service only for other object instances in the model within the MDD tool that are affected by the detected change as specified by the defined constraint targets.

7. The system of claim 6, further comprising a constraint target registry accessible by the validation manager, the registry storing a list of constraint targets on object validation in the model to object instances affected by a change in another object in the model.

8. A computer program product comprising a non-transitory computer usable storage medium storing computer usable program code for dynamic validation of models using constraint targets, the computer program product comprising:

computer usable program code for defining constraint targets on object validation in a model within a model driven development (MDD) tool to object instances affected by a change in another object in the model within the MDD tool, the constraint targets associating different types of objects with corresponding different target object instances;

computer usable program code for detecting a change in an object instance in the model in the MDD tool;

computer usable program code for determining a type of the changed object instance;

computer usable program code for identifying other object instances in the model within the MDD tool defined by the constraint targets to be associated with the determined type; and, computer usable program code for validating only the other object instances in the model within the MDD tool that are affected by the detected change as specified by the defined constraint targets.

9. The computer program product of claim 8, wherein the computer usable program code for defining constraint targets on object validation in a model within a MDD tool to object instances affected by a change in another object in the model, comprises computer usable program code for specifying an object type for an object in the model where changes to an object instance of the object type result in application of a validation rule to a target object instance.

10. The computer program product of claim 9, further comprising computer usable program code for expressing the defined constraint target as an extension point.

11. The computer program product of claim 8, wherein the computer usable program code for validating only other object instances in the model that are affected by the detected change, comprises:

computer usable program code for matching a target object instance to an object type for an object in which the change as been detected;

computer usable program code for loading a validation rule for the target object instance; and, computer usable program code for applying the validation rule to the target object instance.

12. The computer program product of claim 11, further comprising computer usable program code for passing results from having applied the validation rule to the target object instance to a registered presenter of results.

* * * * *